United States Patent [19]

Thoor

[11] Patent Number: 4,832,154

[45] Date of Patent: May 23, 1989

[54] BUFFER STOP DEVICE FOR A SIDE LOADING FURNACE

[75] Inventor: Henry A. Thoor, Villeneuve sur Yonne, France

[73] Assignee: Stein Heurtey Societe Anonyme, Ris Orangis, France

[21] Appl. No.: 151,897

[22] Filed: Feb. 3, 1988

[30] Foreign Application Priority Data

Feb. 10, 1987 [FR] France ............................... 87 01963

[51] Int. Cl.[4] ......................... F27D 23/00; F03G 3/00; B65G 37/00

[52] U.S. Cl. ......................................... 185/27; 49/233; 49/345; 74/105; 198/463.4; 414/216; 432/239

[58] Field of Search .................... 74/105; 49/233, 445; 110/173 R; 185/27, 32, 33; 432/239; 198/463.4; 414/216

[56] References Cited

U.S. PATENT DOCUMENTS

| | | | |
|---|---|---|---|
| 63,444 | 4/1867 | Van Eps | 49/233 |
| 1,562,582 | 11/1925 | Parker | 198/463.4 |
| 3,368,865 | 2/1968 | Schuck | 432/246 X |
| 4,109,780 | 8/1978 | Halsey | 198/463.4 |

FOREIGN PATENT DOCUMENTS

| | | | |
|---|---|---|---|
| 2204936 | 8/1973 | Fed. Rep. of Germany | 198/463.4 |

*Primary Examiner*—Allan D. Herrmann
*Attorney, Agent, or Firm*—Herbert Dubno

[57] ABSTRACT

A buffer stop for an opening on a side-loading and side unloading furnace is mounted on a parallelogram linkage connected with a fixed support and is moved into position and out of position by the movement of a counterweight along a shaft on a member of the parallelogram linkage.

4 Claims, 2 Drawing Sheets

BUFFER STOP DEVICE FOR A SIDE LOADING FURNACE

BACKGROUND OF THE INVENTION

Furnaces are known which may be loaded at will fromo ne or any other of their lateral sides. At each one of its side doors the furnace comprises a buffer stop which is positioned in the opening of the door when it is not used so as to block the products which are loaded through the other door and positioned on a roller conveyor.

The present invention relates to a buffer device for a side loading furnace in which the buffer stop may be readily retracted when the loading side is changed.

SUMMARY OF THE INVENTION

According to the invention the buffer is suspended from a fixed structure by means of an articulated parallelogram, and comprises means for deforming the parallelogram and, consequently, for movement of the buffer stop. The latter means can include a counterweight movable along a shaft integral with one of the parts forming the parallelogram and means for moving this counterweight.

In a particular embodiment of the invention, the counterweight is mounted on one of the legs of an L shaped part whose other leg forms one of the elements of the articulated parallelogram.

BRIEF DESCRIPTION OF THE DRAWING

One embodiment of the device of the invention will be described hereafter by way of example with reference to the accompanying drawings in which.

DESCRIPTION OF THE PREFERRED EMBODIMENT

Figure 1:
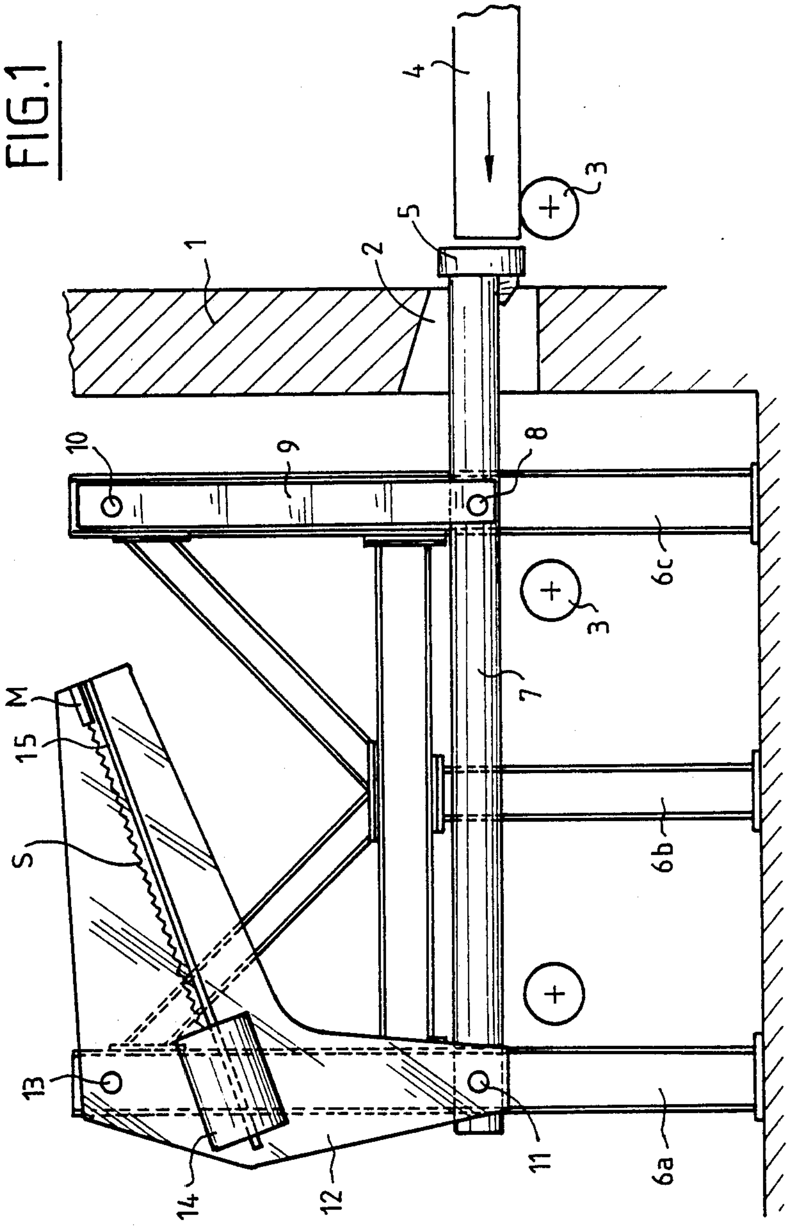
FIG. 1 is a side view of the device, the buffer stop being in an active position.

In the drawing, the side wall 1 of a furnace is shown to comprises an opening 2 placed in front of a line of rollers 3. Opening 2 may serve at will for loading products 4 which are into the furnace on the rollers 3, or for unloading products which are loaded through an opening provided in the opposite side wall; a retractable buffer stop 5 is provided for preventing, in the second case, the products 4 loaded into the furnance from leaving the furnace.

The buffer stop 5 is supported by a structure formed by three columns **6*a*, 6*b* and 6*c*. Stop 5 is carried by an arm 7 hinged at pin 8 at the lower end of a link 9 whose upper end is hinged at pin 10 to column 6*c*. The end of arm 7 is hinged at pin 11, to an L-shaped part 12 which is hinged to column 6*a* at pin 13 situated at the same height as pins 10. Shafts 8, 10, 11 and 13 are the apices of a parallelogram; arm 7** is thus held horizontal.

Pin 13 is substantially at the top of the L shaped part 12 whereas pin 11 is provided in the vicinity of the end of one of its legs. A counterweight 14 is mounted for moving along an a shaft 15 along the other leg of part 12. A jack J1 FIG. 21 or else an endless screws driven by an electric or hydraulic motor M FIG. 1, shown only diagrammatically in the drawing, provides movement of counterweight 14 along shaft 15.

In FIG. 1, stop 5 is disposed in opening 2 opposite workpieces 4 and pins 8 and 11 are situated respectively vertically in line with pins 10 and 13; the buffer thus prevents the workpieces from leaving the furnace. It will be noted that, in this position, the center of gravity of counterweight 14 is substantially vertically in line with pivot 13 so that the position of arm 7 link 9 and of part 12 is a stable balanced position and, thus arm 7 with stop 5 remains in the position shown.

Figure 2:
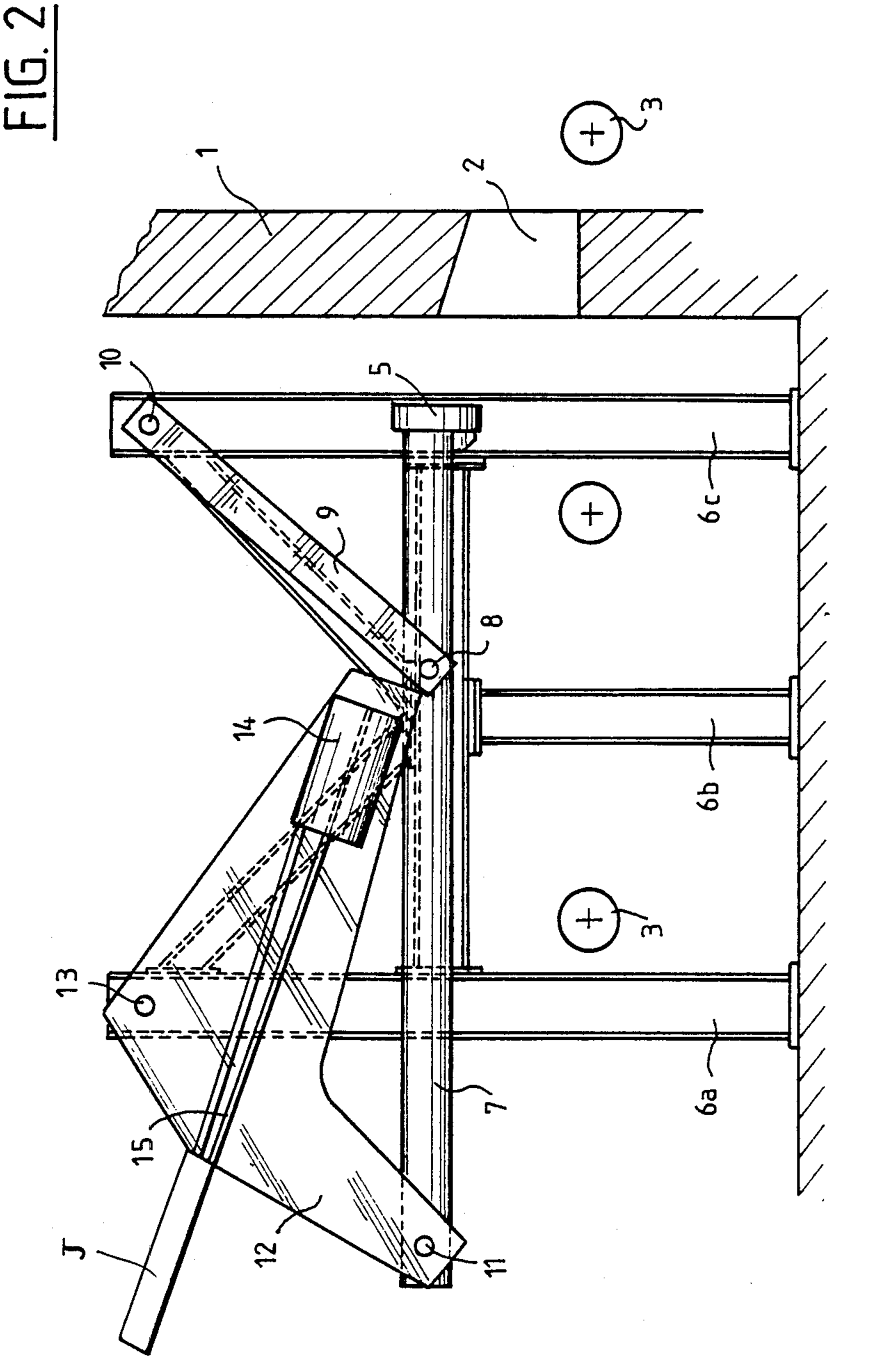
FIG. 2 is a view similar to FIG. 1, the buffer stop being in a retracted position.

If opening 2 is to serve as opening for loading the furnace, the counterweight 14 is moved so as to bring it to the end of the second leg of part 12. The counterweight thus exerts on the part a torque which tends to cause it to pivot in a clockwise direction. This movement results in moving stop 5 out of opening 2 and lifting arm 7 with the stop (FIG. 2), which releases the passage for loading work pieces 4 into the furnace. When the counterweight 14 is at the end of its travel, arm 7 occupies a position in which the torque exerted by the mobile assembly counterbalances that generated by the counterweight 14.

When counterweight 14 is brought back into its initial position, the torque exerted by the mobile assembly tends to bring it back to its position shown in FIG. 1, stop 5 being again in its active position.

It goes without saying that the present invention must not be considered as limited to the embodiment described and shown but, on the contrary, covers all variants thereof.

What is claimed is:

1. A buffer stop device for a side loading furnace, comprising:
- a buffer stop;
- means for suspending said buffer stop from a fixed structure and including an articulated parallelogram; and
- means for deforming the parallelogram and, consequently, for movement of the buffer stop, said means for deforming including;
- a shaft integral with a part of the parallelogram;
- a counterweight movable along said shaft integral with said part of the parallelogram, and
- means for moving this counterweight.

2. The device defined in claim 1, wherein said counterweight and shaft are on one of the legs of an L shaped part whose other leg forms one of the elements of the articulated parallelogram.

3. The device as claimed in claim 1, wherein the means for moving the counterweight are formed by a jack.

4. The device as claimed in claim 1 wherein the means for moving the counterweight are formed by an endless screw driven by a motor.

* * * * *